United States Patent
Kunii et al.

(10) Patent No.: US 7,309,289 B2
(45) Date of Patent: Dec. 18, 2007

(54) COUPLING STRUCTURE AND COUPLING METHOD FOR POWER TRANSMISSION

(75) Inventors: Rikiya Kunii, Saitama (JP); Yasushi Sugiura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 11/004,887

(22) Filed: Dec. 7, 2004

(65) Prior Publication Data

US 2005/0126285 A1    Jun. 16, 2005

(30) Foreign Application Priority Data

Dec. 12, 2003  (JP)  .......................... P2003-414238

(51) Int. Cl.
    *F16D 1/02*    (2006.01)
(52) U.S. Cl. ................ 464/23; 116/DIG. 21
(58) Field of Classification Search .............. 464/23, 464/180; 73/455, 487, 66; 116/333, DIG. 21; 403/27

See application file for complete search history.

(56) References Cited

U.S. PATENT DOCUMENTS 1,645,323 A * 10/1927 Griswold ................ 464/180 X
1,733,821 A * 10/1929 Pontis ....................... 73/487 X
1,980,693 A * 11/1934 Newman et al. ........... 73/487 X
2,120,925 A *  6/1938 Webster
4,824,275 A *  4/1989 Schlonski .................... 403/27
6,475,091 B1 * 11/2002 Sugiura et al. ............... 464/23

FOREIGN PATENT DOCUMENTS

| JP | 7-8632 | 2/1995 |
| JP | 7-167219 | 7/1995 |
| JP | 10-194004 | 7/1998 |
| JP | 2002-104002 | 4/2002 |

* cited by examiner

*Primary Examiner*—Greg Binda
(74) *Attorney, Agent, or Firm*—Westerman, Hattori, Daniels & Adrian, LLP.

(57) ABSTRACT

A first mark for indicating the direction of the rotational unbalance of a propeller shaft is provided on the propeller shaft while a second mark for indicating the direction of the rotational unbalance of a companion flange is provided on the companion flange, which is to be connected to the propeller shaft at a rotation-transmitting device. One of the directions of the rotational unbalances indicated by the first mark and the second mark is set as a direction along which the rotating mass becomes larger while the other is set as a direction along which the rotating mass becomes smaller, and one of the first mark and the second mark is provided over an angular region with a predetermined angle around an axis.

2 Claims, 12 Drawing Sheets

Fig. 7A
(Prior Art)
Fig. 7B
(Prior Art)
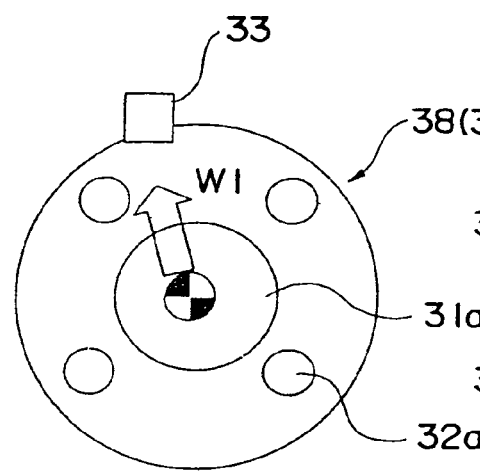
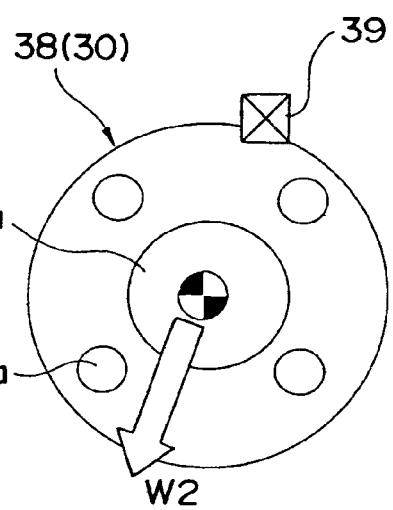
Fig. 8A
(Prior Art)
Fig. 8B
(Prior Art)
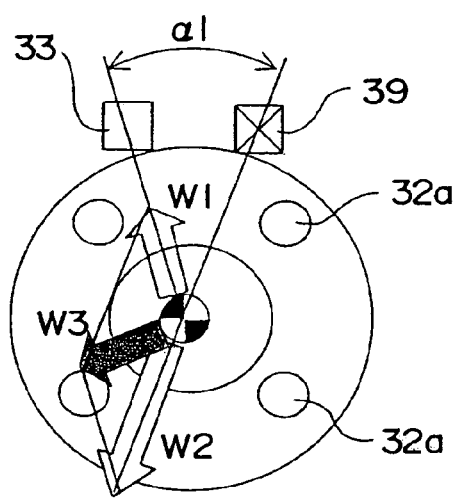
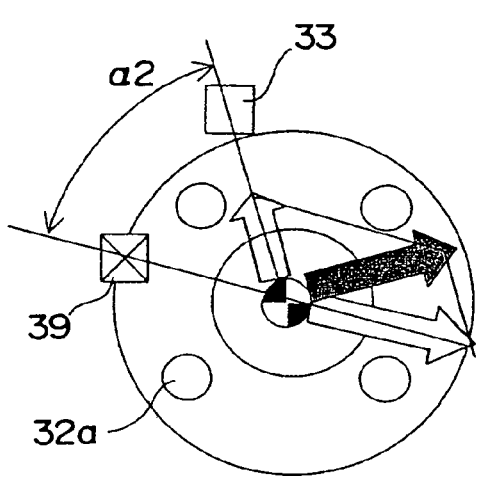

*Fig. 11A*
(Prior Art)
*Fig. 11B*
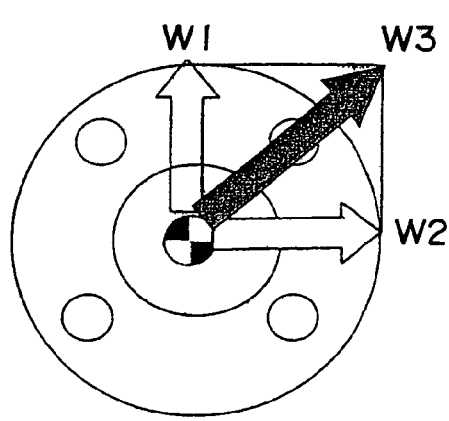
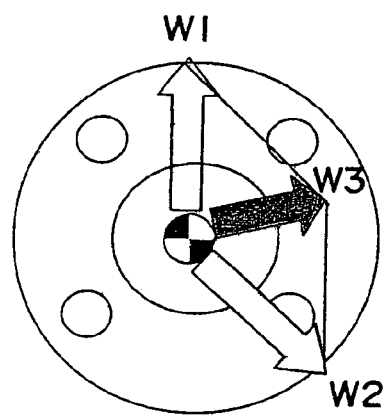

COUPLING STRUCTURE AND COUPLING METHOD FOR POWER TRANSMISSION

FIELD OF THE INVENTION

The present invention relates generally to a power transmission comprising a propeller shaft, which transmits the driving force of an engine, and an axle device, which transmits the rotational driving force of the propeller shaft to right and left wheels of a vehicle, for example, an automobile, and it relates particularly to a coupling structure that connects the propeller shaft to the axle device in a power transmission.

BACKGROUND OF THE INVENTION

An automobile of FR drive model or four-wheel drive model includes a power transmission, which transmits the rotational driving force of the engine to the drive wheels, and it generally has an arrangement in which the rotational driving force is transmitted from the transmission through a propeller shaft to an axle device. For example, the engine is placed in the front part of the vehicle, and the output rotation of the transmission, which is coupled to the engine, is transmitted through the propeller shaft to the rear axle device. Various such power transmissions have been known, and some are disclosed in Japanese Laid-Open Patent Publication No. H10(1998)-194004 and in Japanese Laid-Open Utility-Model Publication No. H07(1995)-8632.

By the way, if a rotational member of the power transmission is unbalanced, then there is a problem of vibration that can occur because of the unbalance while the rotation is being transmitted. Especially, the propeller shaft, which is a long cylindrical member that extends longitudinally in the vehicle, is likely to experience a rotational unbalance. Another element that can cause a rotational unbalance is a coupling device, which is used for connecting the propeller shaft to the axle device. The coupling device comprises as components a yoke flange, a companion flange and the like, which are forged parts and not in perfect rotational configuration (not in ring figure or in cylindrical figure).

To solve this problem, conventionally, various methods are adopted to prevent occurrence of rotational unbalance (for example, refer to Japanese Laid-Open Patent Publication No. H07(1995)-167219). Particularly, an unbalance-offsetting method has been practiced in recent years. In this method, the unbalances are determined individually for the propeller shaft and for the companion flange of the axle device before their assembly in the vehicle. A point where one of the unbalanced rotating masses, i.e., either the propeller shaft or the companion flange, becomes heaviest (heavy point) is defined and marked, and a point where the other of the unbalanced rotating masses becomes lightest (light point) is defined and marked. When the propeller shaft and the companion flange are connected to each other in the assembly process of the vehicle, the heavy point and the light point are phased to offset the rotational unbalances.

In such a method, which adjusts the unbalances of the propeller shaft and the companion flange during the assembly process, while a worker is confirming that the two markings of the heavy and light points are within a predetermined phase angle, he must position the holes for the insertion of stud bolts for the connection of the propeller shaft and the companion flange. Therefore, the workability of this method is terribly bad. Moreover, it is difficult to determine whether or not the two markings of the heavy and light points are within a predetermined angle, so there has been a problem that relatively small deviations of these markings are not determinable. In a conventional technique that attempts to solve this problem, the holes for the insertion of bolts are positioned to make the two markings of the heavy and light points closest to each other before the fastening of the bolts. However, the propeller shaft and the companion flange have each, for example, n bolt holes, so there is a possibility of phase deviation for the markings within a range of +360/n to −360/n degrees in the assembly process. This range for the phase deviation has been so great to jeopardize the effectiveness of the above mentioned unbalance-offsetting method (refer to Japanese Laid-Open Patent Publication No. 2002-104002).

SUMMARY OF THE INVENTION

To solve the above mentioned problem, it is an object of the present invention to provide a coupling structure and a coupling method for a power transmission, in which structure and method, a phase deviation is relatively small, and a phase difference is easily determinable.

A coupling structure according to the present invention is a structure for connecting a propeller shaft and a rotation-transmitting device for a power transmission. In the power transmission, the propeller shaft transmits a rotational driving force, and the rotation-transmitting device, which is connected to the propeller shaft, also transmits the rotational driving force. In the coupling structure, a first mark for indicating the direction of the rotational unbalance of the propeller shaft is provided on the propeller shaft while a second mark for indicating the direction of the rotational unbalance of a companion flange is provided on the companion flange, which is to be connected to the propeller shaft at the rotation-transmitting device. One of the directions of the rotational unbalances indicated by the first mark and the second mark is set as a direction along which the rotating mass becomes larger while the other is set as a direction along which the rotating mass becomes smaller. Furthermore, one of the first mark and the second mark is provided over an angular region with a predetermined angle around an axis. On the basis of the first mark and the second mark, the propeller shaft and the companion flange are connected with each other. If the number n of bolt holes are used for connecting the propeller shaft and the companion flange, then the angular region is set approximately from +180/n to −180/n degrees.

The first or second mark that is provided over the predetermined angular region may be provided as a band-like mark covering all the angular region, or it may be provided as a band-like mark covering a predetermined length inward from each boundary of the angular region. However, it is preferable that the first or second mark that is provided over the predetermined angular region be set to overextend by a constant length, outward beyond each boundary of the predetermined angular region. Furthermore, the first or second mark that is provided over the predetermined angular region may further comprise a mark which is provided at the central part of the predetermined angular region. In this way, the visibility of the mark provided over the predetermined angular region is improved for the assembly almost to the same level as in the case where the whole angular region is marked as a band.

In a coupling method for a power transmission according to the present invention, at first, a measurement is made for the direction of the rotational unbalance of the propeller shaft as a single part, and the propeller shaft is provided with a first mark that indicates the direction of the rotational unbalance of the propeller shaft as a single part. Then, a measurement is made for the direction of the rotational unbalance of the companion flange as a single part, for the companion flange to be connected to the propeller shaft at the rotation-transmitting device, and the companion flange is provided with a second mark that indicates the direction of the rotational unbalance of the companion flange as a single part. Here, one of the directions of the rotational unbalances indicated by the first mark and the second mark is set as a direction along which the rotating mass becomes larger while the other is set as a direction along which the rotating mass becomes smaller, and one of the first mark and the second mark is provided over an angular region with a predetermined angle around an axis. Furthermore, the propeller shaft and the companion flange are positioned rotationally such that the one of the first mark and the second mark that is provided over the predetermined angular region is met by the other, and then, the propeller shaft and the companion flange are connected with each other. It is preferable that if the number n of bolt holes are used for connecting the propeller shaft and the companion flange, then the angular region be set approximately from +180/n to −180/n degrees, and that the bolt holes be positioned such that the one of the first ark and the second mark that is provided over the predetermined angular region is met by the other.

In the coupling method, the first or second mark that is provided over the predetermined angular region may be provided as a band-like mark covering all the angular region or may be provided as a band-like mark covering only a predetermined length inward from each boundary of the angular region. However, it is preferable that the first or second mark that is provided over the predetermined angular region be marked to overextend by a constant length, outward beyond each boundary of the predetermined angular region. Furthermore, the first or second mark that is provided over the predetermined angular region may further comprise a mark which is provided at the central part of the predetermined angular region.

According to the present invention, the rotational unbalances of the propeller shaft and the companion flange are offset effectively one against the other. Specifically, for the rotational unbalance, a marking is made at the light point or heavy point unbalance of the propeller shaft as a single part, and in contrast, another marking is made at the heavy point or light point unbalance of the companion flange as a single part. In the assembly process, the propeller shaft and the companion flange are positioned rotationally to bring these markings closer to each other before their connection, for offsetting both the unbalances. According to the present invention, to enhance the effectiveness of the rotational unbalance offsetting, one of the marks (for example, the second mark 39 described in the following embodiment) is provided over a predetermined angular region around an axis, and the other mark (for example, the first mark 33 described in the following embodiment) is brought into the region of the former mark. By adopting the coupling structure and coupling method, the accuracy of discriminating an angular phase is improved because a large mark with an angular region, which is easy to see, is matched by another mark for the positioning of rotational components. If the number n of bolts are used for the fastening, then the angular region can have a phase deviation only within a range approximately from +360/2n to −360/2n degrees. Therefore, the coupling structure and coupling method according to the present invention achieves a high effectiveness for offsetting rotational unbalances and minimizes the unbalance so offset.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIGS. 7A and 7B are approximate sectional views describing the individual unbalances and the heavy and light point marks of the propeller shaft and the companion flange, respectively, of a prior art.

FIGS. 8A and 8B are approximate sectional views describing unbalances that result from combinations of the individual unbalances described in FIGS. 7A and 7B.

FIGS. 11A and 11B are approximate sectional views describing the effects of the unbalance-offsetting of the prior-art and that of the present invention for comparison.

DETAILED DESCRIPTION OF THE PREFERRED EMBODIMENTS

Figure 1:
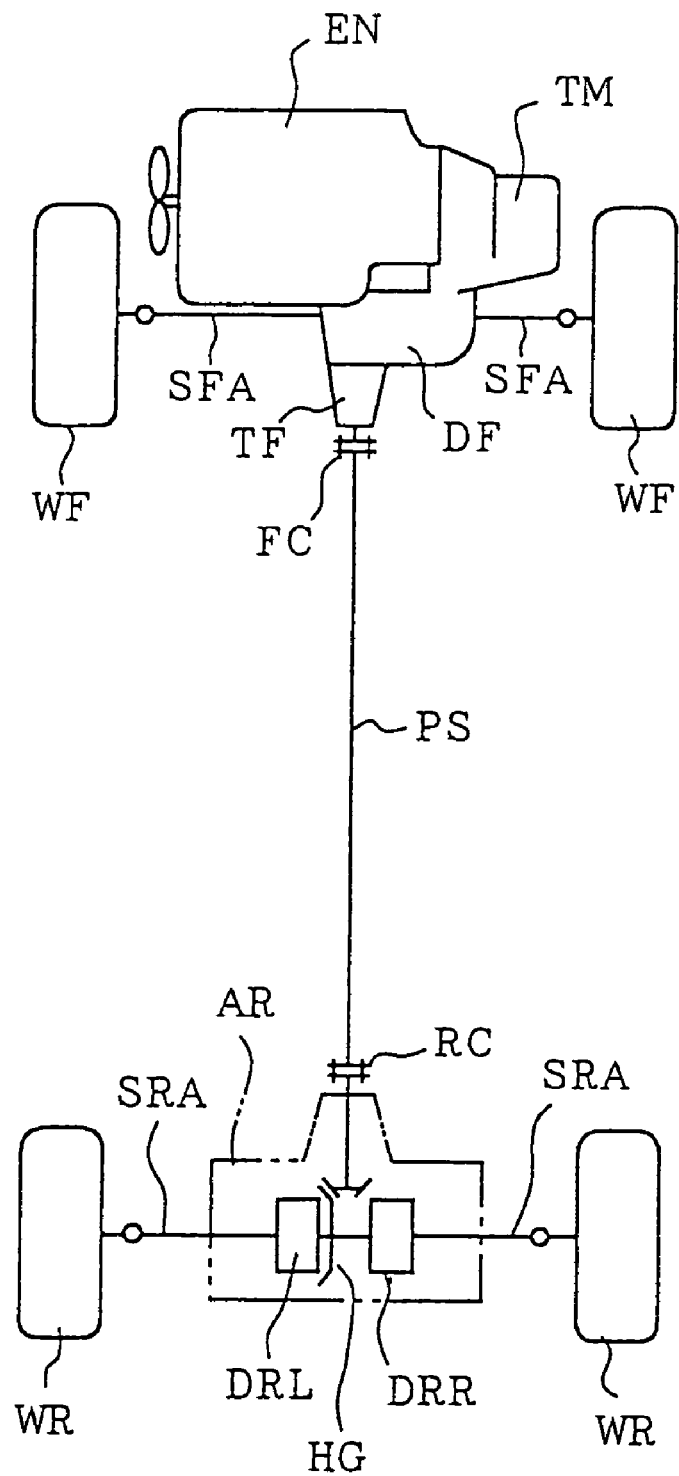
FIG. 1 is a schematic diagram describing the power transmission system of a four-wheel drive vehicle, which comprises a power transmission according to the present invention.
Figure 2:
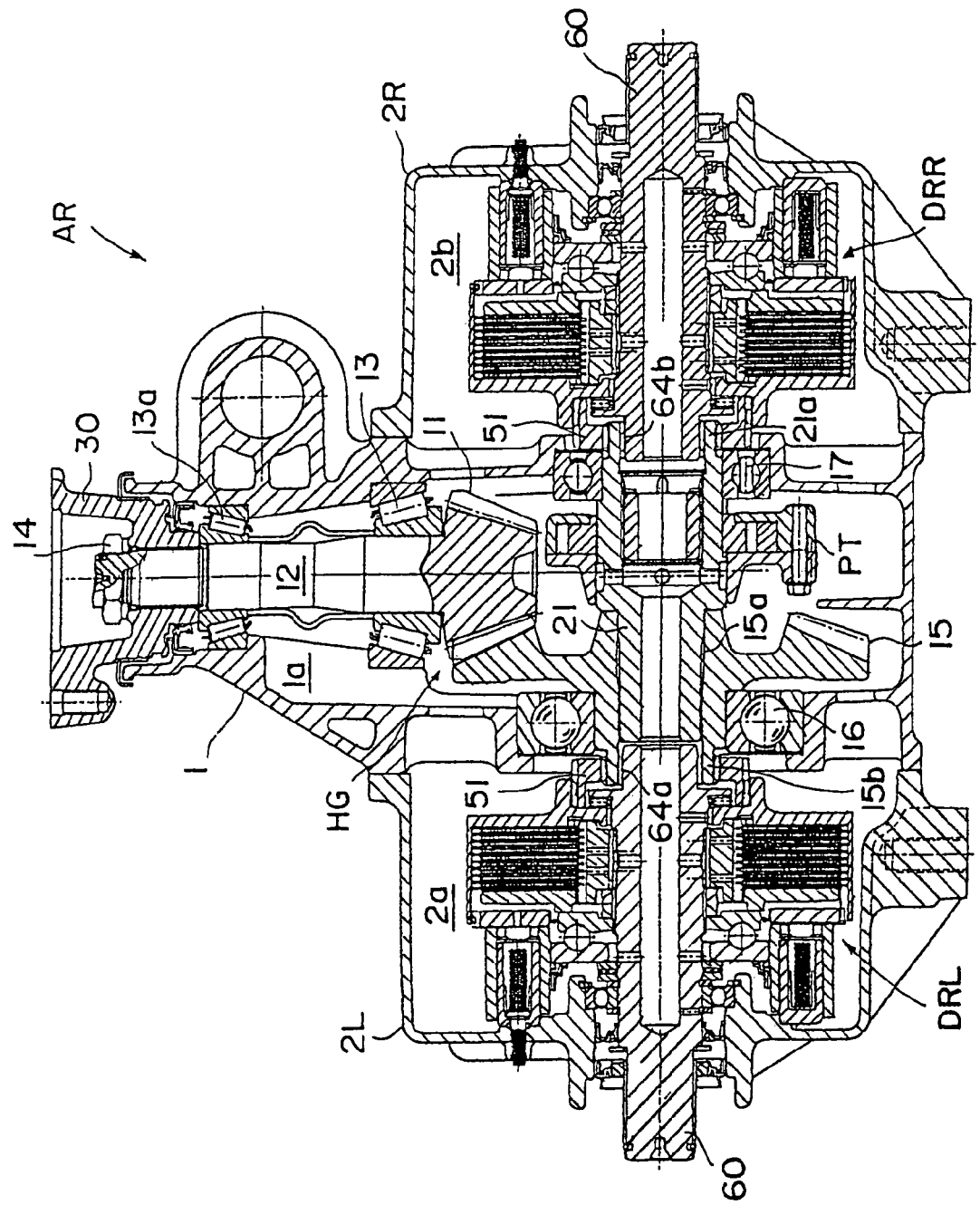
FIG. 2 is a sectional view showing the construction of a rear axle device, which constitutes the power transmission system.
Figure 3:
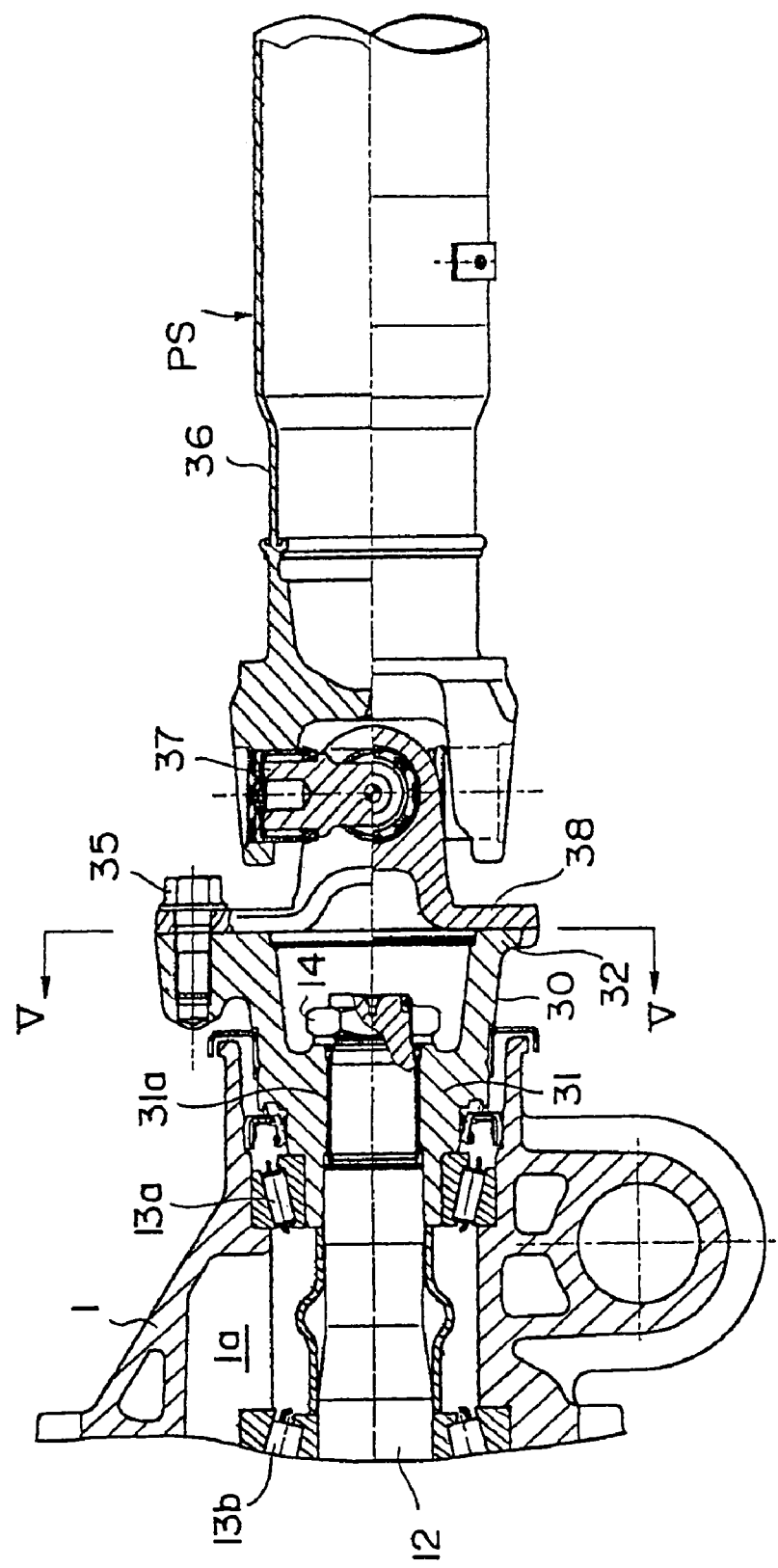
FIG. 3 is a partial sectional view showing the construction of the part that couples the propeller shaft and the rear axle device, which part has a coupling structure according to the present invention.

Now, preferred embodiments according to the present invention are described in reference to the drawings. FIG. 1 shows the power transmission system of a vehicle as an example of power transmission according to the present invention. In this power transmission system, an axle device comprises an electromagnetic clutch as a differential clutch mechanism.

This vehicle is a four-wheel drive vehicle. An engine EN positioned in a lateral orientation is mounted at the front part of the vehicle, and a transmission TM, which includes a front differential mechanism DF and a transfer mechanism TF, is coupled to the output end of the engine EN as a unit. The power of the engine EN is transmitted through the transmission TM with a speed change to the front differential mechanism DF, where the power is divided and transmitted to right and left front axle shafts SFA for driving the right and left front wheels WF. The power of the engine EN is also divided for the transfer mechanism TF, where the power is transmitted through a front coupling FC to a propeller shaft PS, which is connected through a rear coupling RC to a rear axle device AR.

The rear axle device AR comprises a hypoid gear mechanism HG (final reduction mechanism) and a right and left couple of rear differential clutch mechanisms DRR and DRL. The hypoid gear mechanism HG change the rotational direction and reduces the rotational speed transmitted from the propeller shaft PS for the rotational transmition to rear axle shafts SRA, which are disposed orthogonal to the propeller shaft PS. The rear differential clutch mechanisms DRR and DRL are positioned, respectively, on the right and left sides of the hypoid gear mechanism HG, and they control the transmission of the rotational power from the hypoid gear mechanism HG to the right and left rear axle shafts SRA. In the rear axle device AR, while the power of the engine is being transmitted through the propeller shaft PS, the rotational direction is changed as well as the rotational speed is reduced by the hypoid gear mechanism HG, and the division and transmission of the power to the right and left rear axle shafts SRA are controlled for driving the right and left rear wheels WR by the right and left rear differential clutch mechanisms DRR and DRL.

The rear differential clutch mechanisms DRR and DRL comprise electromagnetic clutches, respectively, and these differential clutch mechanisms are controlled in correspondence to the rotational speeds of the wheels, the deceleration of the vehicle and the like. Therefore, while the right and left rear differential clutch mechanisms DRR and DRL are released, the power of the engine is not transmitted to the rear wheels WR, so only the front wheels WF are driven. This is a two-wheel drive mode. On the other hand, if the rear differential clutch mechanisms DRR and DRL are engaged, then the vehicle is set into its four-wheel drive mode for transmitting the power of the engine both to the front wheels WF and to the rear wheels WR. As detailed later in this section, in the four-wheel drive mode, the rear differential clutch mechanisms DRR and DRL are engaged when there is a difference in rotational speed between the wheels and the sides driving the wheels. In addition, the engagement of each of the right and left rear differential clutch mechanisms DRR and DRL is controlled appropriately to control the ratio of the power being transmitted to the right rear wheel and to the left rear wheel, so that these mechanisms function as a differential mechanism.

FIGS. 2~6 show the rear axle device AR, which incorporate the right and left rear differential clutch mechanisms DRR and DRL in a pair as described above. The rear differential clutch mechanisms are symmetrical with each other in construction, so symmetrical parts are given the same indicative numbers to leave out redundant explanation in the following description. The rear axle device AR comprises a center housing 1 and right and left side housings 2R and 2L, which are disposed on the right and left ends of the center housing 1 and are connected thereto, respectively. The above mentioned hypoid gear mechanism HG is positioned in a central space 1a, which is defined in the center housing 1. Also, the above mentioned right differential clutch mechanism DRR is positioned in a right side space 2b, which is defined in the right side housing 2R, while the left differential clutch mechanism DRL is positioned in a left side space 2a, which is defined in the left side housing 2L.

In the center housing 1, the hypoid gear mechanism HG comprises a drive pinion 11 and a driven gear 15, whose rotational axes are disposed orthogonal to each other, with the drive pinion and the driven gear meshing with each other. The drive pinion 11 has a pinion shaft 12, which extends longitudinally in the front and rear direction of the vehicle, with the front end of the pinion shaft 12 extruding from the center housing 1. The pinion shaft 12 is supported rotatably with respect to the center housing 1 by taper roller bearings 13a and 13b, so the drive pinion 11 rotates around the longitudinal axis of the pinion shaft 12.

At the extruding part of the pinion shaft 12, a companion flange 30 is spline-fitted and fixed on the pinion shaft by a retaining nut 14. The companion flange 30 comprises a boss portion 31, where splines 31a are provided for the connection of the companion flange 30 to the pinion shaft 12, and an end-flange portion 32, which has an end-face figure shown in FIG. 5. The end-flange portion 32 is provided with bolt holes 32a, for fixation by fastening bolts. On the other hand, the propeller shaft PS comprises a drive tube 36, which is disposed rotatably and longitudinally in the vehicle, and a yoke flange 38, which is connected through a universal joint 37 to the rear end of the drive tube 36. The yoke flange 38 is connected and fixed with the companion flange 30 by fastening bolts 35, and the yoke flange 38 and the companion flange 30 constitute the rear coupling RC, through which the rotation of the propeller shaft PS is transmitted to the pinion shaft 12 for driving rotationally the hypoid gear mechanism HG.

The driven gear 15, which constitutes the hypoid gear mechanism HG, is supported by the center housing 1 through a ball bearing 16, so it is rotatable around an axis that extends laterally in the direction along the width of the vehicle (this axis is orthogonal with the rotational axis of the pinion gear 11). The driven gear 15 is provided with internal splines 15a, which are oriented radially from the rotational axis. Through the internal splines 15a, the left end portion of a center shaft 21, which is disposed coaxial to the driven gear 15 in the center housing 1, meshes with the driven gear 15, and the right end portion of the center shaft 21 is supported by the center housing 1, rotatably through a ball bearing 17. Therefore, the center shaft 21 rotates together with the driven gear 15 as a one-piece body.

The outer periphery of the left end portion 15b of the driven gear 15 is spline-fitted with a left connection ring 51, through which the driven gear 15 is connected rotationally with the left differential clutch mechanism DRL. Also, the outer periphery of the right end portion 21a of the center shaft 21 is spline-fitted with a right connection ring 51, through which the center shaft 21 is connected rotationally with the right differential clutch mechanism DRR. Because the center shaft 21 is spline-fitted with the driven gear 15, the driven gear 15, i.e., the hypoid gear mechanism HG, is connected rotationally to the right and left differential clutch mechanisms DRR and DRL.

Figure 4:
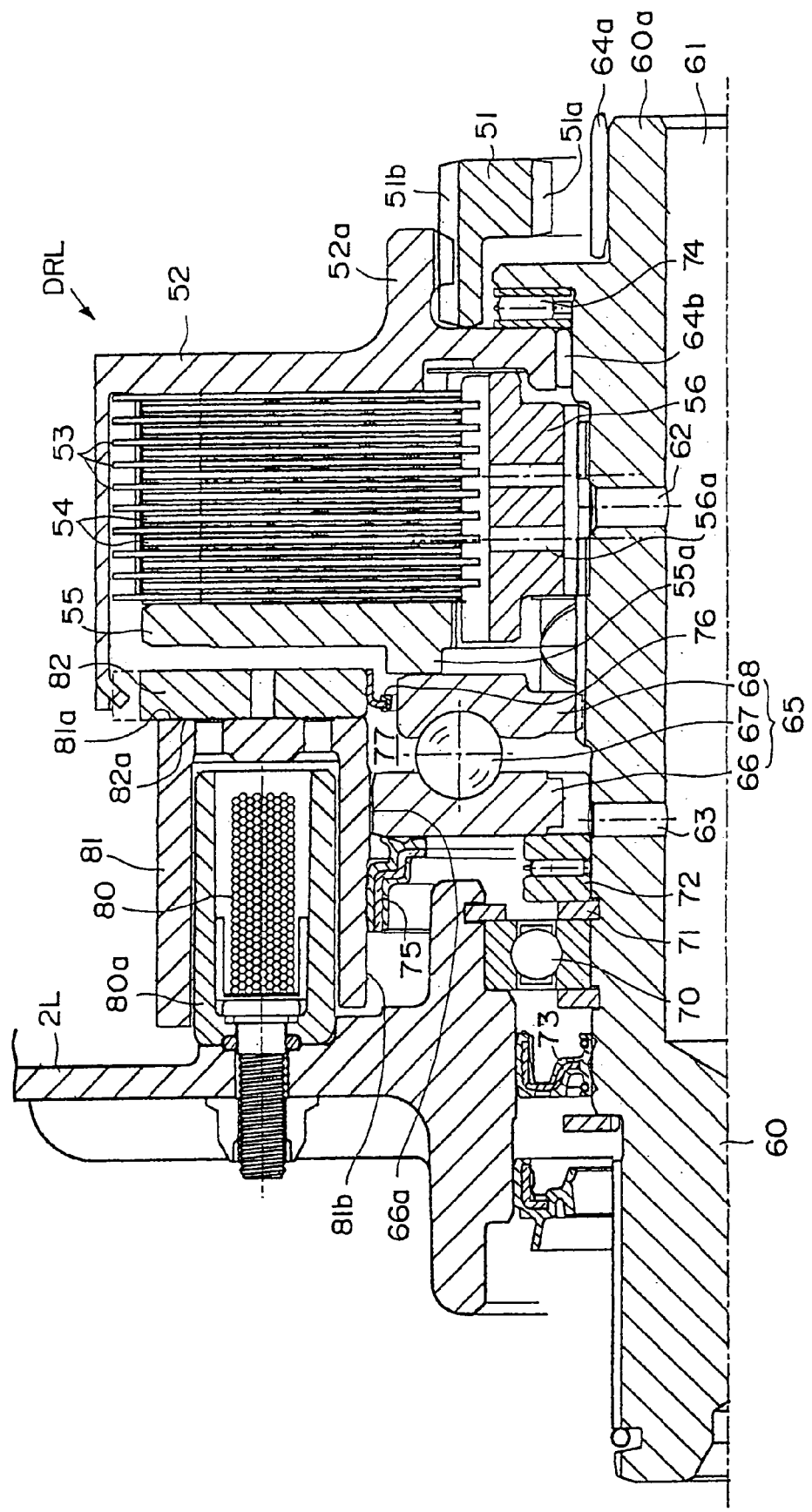
FIG. 4 is a sectional view showing the left differential clutch mechanism of the rear axle device.

Now, the right and left differential clutch mechanisms DRR and DRL are described in reference to FIG. 4, which shows only the left differential clutch mechanism DRL. As mentioned above, the left differential clutch mechanism DRL is symmetrical with the right differential clutch mechanism DRR in construction, so they are identical in their construction and operation. Therefore, only the left differential clutch mechanism DRL is described in the following, leaving out the right differential clutch mechanism DRR.

The left differential clutch mechanism DRL comprises a cylindrical clutch housing 52, a plurality of separator plates 53, which are disposed in the cylindrical clutch housing 52, and a plurality of clutch plates 54. The cylindrical clutch housing 52 has a hub portion 52a at its right side end, and this right-end hub portion 52a is spline-fitted on the outer periphery 51b of the connection ring 51. Each of the separator plate 53, which is a metal disc member, is engaged with its outer portion to the internal surface of the clutch housing 52, so the separator plates 53 rotate together with the clutch housing 52 as a one-piece body. Each of the clutch plates 54 is a metal disc member, and a clutch facing material is pasted on each side of this disc member. The clutch plates 54 are positioned in the spaces partitioned by the separator plates 53, one by one. In other words, a separator plate 53 and a clutch plate 54 are placed alternately in the axial direction. The separator plates 53 and the clutch plates 54, which are positioned alternately, are sided by a disc-like pressure plate 55, which is positioned outwardly to these plates.

In the clutch housing 52, a clutch hub 56 is located internal to the separator plates 53, the clutch plates 54 and the pressure plate 55, and the inner portion of each clutch plate 54 is engaged to the outer periphery of the clutch hub 56. Therefore, the clutch plates 54 and the clutch hub 56 rotate together as a one-piece body. The clutch hub 56 with its internal splines is disposed on and spline-fitted to a left side shaft 60, and the clutch housing 52 is mounted on the left side shaft 60 through a radial bearing 64b and a thrust bearing 74.

The right end portion 60a of the left side shaft 60 is supported by a radial bearing 64a, which is placed in a bearing hole provided at the left side of the driven gear 15, and the left side portion of the left side shaft is supported through a ball bearing 70 by the left side housing 2L. The left side shaft 60, which is rotatable, is connected to a rear wheel WR, constituting the left rear axle shaft SRA. In the case of the right side shaft 60, its left end portion is supported rotatably by a radial bearing 64a, which is placed in a bearing hole provided at the right side of the center shaft 21.

The pressure plate 55 has a pushed portion 55a, which protrudes leftward at the inner left side of the pressure plate 55, and a ball-cam mechanism 65 is provided in contact with the pushed portion 55a. The ball-cam mechanism 65 comprises a first cam plate 66, which is disposed rotatably over the left side shaft 60, a second cam plate 68, which is spline-fitted to and mounted on the left side shaft 60, and a plurality of cam balls 67, which are positioned in a plurality of cam grooves 66a and 68a (refer to FIGS. 6A and 6B).

The position of the first cam plate 66 is defined axially through a thrust bearing 72 by a retaining ring 71 with respect to the left side shaft 60, so the first cam plate 66 receives a thrust that is being generated by the ball-cam mechanism 65, which is detailed also later in this section. This thrust acts through the cam balls 67 on the second cam plate 68, and as a result, the second cam plate 68 shifts rightward and pushes the pushed portion 55a of the pressure plate 55 rightward.

At the outer periphery of the first cam plate 6, provided is a doughnut-like coil housing 81, which has a rectangular cross-section whose left side is open outwardly. The coil housing 81 has a figure of doughnut, whose center coincides with the rotational axis of the left side shaft 60. The inner circumference part of the coil housing 81 is spline-fitted to the outer periphery of the first cam plate 66, so that the coil housing 81 can rotate together with the first cam plate 66 as a one-piece body over the left side shaft 60. In the coil housing 81, i.e., the space defined by the rectangular cross-section whose left side is open, a solenoid coil 80 is provided protrudingly. The solenoid coil 80, which also has a figure of doughnut and is covered with a solenoid cover 80a, is fixed on the inner wall of the left side housing 2L. There is a clearance between the outer surface of the solenoid cover 80a and the inner surface of the rectangular cross-section space of the coil housing 81, so the coil housing 81 can rotate with respect to the solenoid coil 80, which is fixed stationary.

The coil housing 81 has a sliding face 81a, which is provided on the outer right end wall of the coil housing 81, and a disc-like armature plate 82 is disposed against the sliding face 81a. The outer periphery of the armature plate 82 is engaged to the clutch housing 52, so that the armature plate 82 rotates together with the clutch housing 52 as a one-piece body.

On the inner circumference wall 81b of the coil housing 81, an oil seal 75 is press-fitted, so that the lip of the oil seal 75 is positioned in contact with and can slide on the left side face of the first cam plate 66. Also, on the inner circumference wall of the armature plate 82, an oil fence ring 76 is press-fitted, defining an oil well section 77 by the oil seal 75, the oil fence ring 76 and the inner circumference walls of the coil housing 81 and the armature plate 82. The oil well section 77 is in fluid communication with the clearance between the sliding face 81a of the coil housing and the sliding face 82a, i.e., the left side face, of the armature plate 82.

The oil fence ring 76 comprises a metal ring as core member and a rubber lip, which is attached at the inner circumference of the metal ring, and the inner circumference end of the oil fence ring 76 is disposed in proximity to the outer periphery of the second cam plate 68. In this condition, even though the oil fence ring 76 comes into contact with the second cam plate 68 while they are rotating, there is no problem of noise generation or of damage because the contact is between rubber and metal.

Furthermore, a first lubrication bore 61 is provided in the left side shaft 60, extending axially from the right end thereof, and a second lubrication bore 62 and a third lubrication bore 63 are provided extending radially from the first lubrication bore 61. Lubricating oil is supplied into the first lubrication bore 61 from a trochoidal pump PT, which is mounted on the center shaft 21. This lubricating oil is supplied from the second lubrication bore 62 through lubrication bores 56a provided in the clutch hub 56 to the spaces between the separator plates 53 and the clutch plates 54 and also from the third lubrication bore 63 through the ball-cam mechanism 65 (through the space between the first cam plate 66 and second cam plate 68) to the oil well section 77. As a result, the ball-cam mechanism 65 is lubricated well.

The lubricating oil in the oil well section 77 is supplied effectively to the clearance between the sliding face 81a of the coil housing 81 and the sliding face 82a of the armature plate 82, smoothing the sliding contact between these sliding faces 81a and 82a, so there is no chance for noise to generate from the sliding contact of these sliding faces 81a and 82a.

Now, the operation of the left differential clutch mechanism DRL, which is constructed as described above, is described.

As mentioned above, after the rotational power is transmitted from the propeller shaft PS to the hypoid gear mechanism HG, rotationally driving the driven gear 15, the rotational power is transmitted through the connection ring 51 to the clutch housing 52, rotationally driving the clutch housing 52. Here, while no thrust is acting through the ball-cam mechanism 65 on the pressure plate 55, i.e., while the pressure plate 55 is free, the separator plates 53 rotate together with the clutch housing 52 as a one-piece body, and the clutch plates 54 rotate together with the clutch hub 56 as a one-piece body. There is no transmission of power between the separator plates 53 and the clutch plates 54, so the rear wheels WR do not receive driving force. In this condition, the vehicle is in its two-wheel drive mode.

On the other hand, when a thrust is applied by the ball-cam mechanism 65 pushing the pressure plate 55 rightward, the pressure plate 55 pushes the separator plates 53 and the clutch plates 54 onto the clutch housing 52. As a result, a friction is generated between the separator plates 53 and the clutch plates 54, and now, these plates are engaged to each other by the friction and rotate together. As a result, the clutch housing 52 and the clutch hub 56 rotate together as a one-piece body, transmitting the driving force to the rear wheels WR. In this condition, the vehicle is in its four-wheel drive mode.

The control for applying a thrust by the ball-cam mechanism 65 onto the pressure plate 55 is achieved actually by controlling the electrical current flowing through the solenoid coil 80. When the solenoid coil 80 is energized, a magnetic force is generated at the coil housing 81, attracting and attaching the armature plate 82 onto the coil housing 81. As a result, the sliding face 81a of the coil housing 81 and the sliding face 82a of the armature plate 82 come slidingly into contact with each other. Then, on the coil housing 81, a rotational force F acts to make the coil housing 81 rotate at the same rotational speed as the armature plate 82, which rotates together with the clutch housing 52 as a one-piece body.

Because the coil housing 81 is connected to the first cam plate 66, which is connected to the left side shaft 60, the coil housing rotates together with the rear wheel WR as a one-piece body. On the other hand, the armature plate 82 is engaged to the clutch housing 52, which is connected rotationally to the driven gear 15, so the armature plate 82 rotates in correspondence to the rotation of the engine EN. It is clear from this that while the rotational speed of the rear wheel WR is the same as that of the driven gear 15, which is driven by the engine EN, the above mentioned rotational force F is not generated. However, if there is a rotational difference, then a rotational force F is generated.

Figures 6A, 6B:
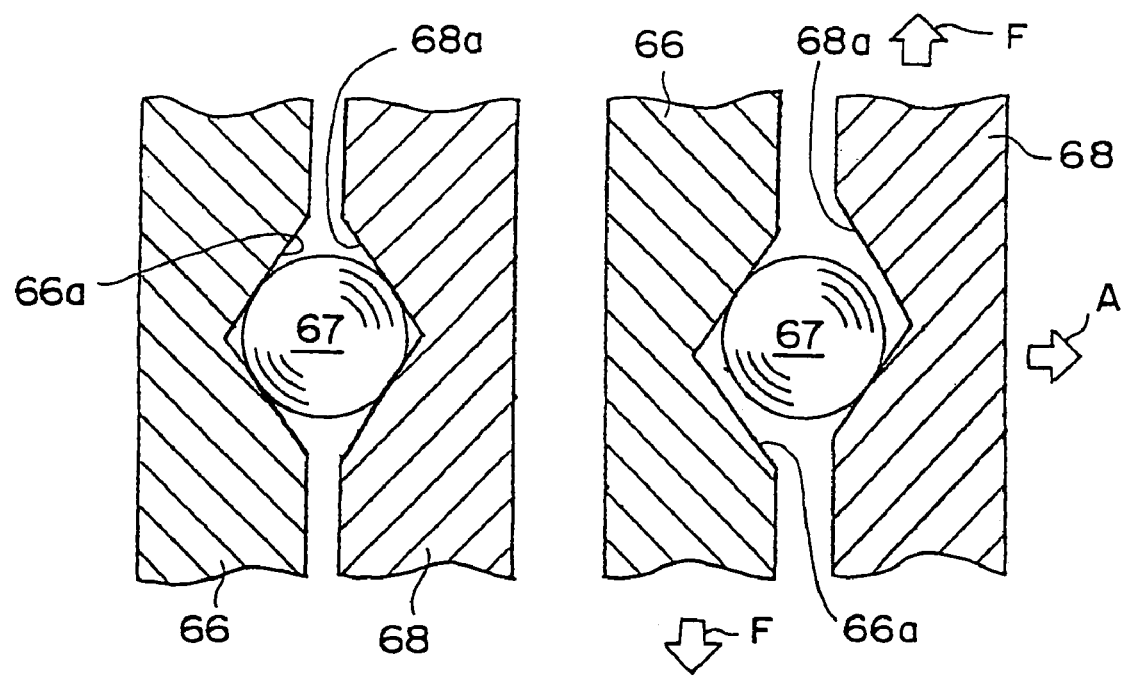
FIG. 6 is a sectional view showing a ball-cam mechanism that constitutes the left differential clutch mechanism.

As mentioned, if there is a rotational difference between the rotation of the rear wheel WR and that of the driven gear 15, which is driven by the engine EN, then a rotational force F is generated to act as a force that rotates the second cam plate 68 with respect to the first cam plate 66 in the ball-cam mechanism 65 as shown in FIG. 6B. Between the two cam plates 66 and 68, cam balls 67 are provided in cam grooves 66a and 68a, which have tapered faces. Therefore, the second cam plate 68 is rotated with respect to the first cam plate 66 by the above mentioned rotational force F. By this relative rotation, the second cam plate 68 is shifted axially rightward as described by arrow A in FIG. 6B.

As the second cam plate 68 shifts rightward in this way, it pushes the pushed portion 55a of the pressure plate 55 rightward. Then, the pressure plate 55 pushes the separator plates 53 and the clutch plates 54 to the clutch housing 52. As a result, the separator plates 53 and the clutch plates 54 are engaged with each other by the friction generated between them, minimizing the above mentioned rotational difference. The pressing force acting on these plates 53 and 54 in this case corresponds to the above mentioned rotational force F, which corresponds to the magnetic force of the solenoid coil 80 attracting the armature plate 82.

It is understood from this that, by controlling the current flowing through the solenoid coil 80, the clutching force of the left differential clutch mechanism DRL is freely controllable to slide the sliding face 82a of the armature plate 82 over the sliding face 81a of the coil housing 81 or to attach the armature plate 82 onto the coil housing 81. This control is executed smoothly because lubricating oil is supplied effectively from the oil well section 77 to the clearance between these sliding faces 81a and 82a.

In the case where the sliding face 82a of the armature plate 82 is attached on the sliding face 81a of the coil housing 81, if there is a clearance between these sliding faces 81a and 82a, then the lines of magnetic flux are disturbed there, and the attracting force of the magnet is reduced. To prevent this problem, the clearance between these sliding faces 81a and 82a is made as small as possible. In other words, it is preferable that these sliding faces 81a and 82a be adhered firmly to each other. However, because the armature plate 82 has a disc-like figure as shown in the drawing, it can deform into a cone-like figure, for example, after a thermal treatment during the production of the armature plate 82. Even though such a deformation is minuscule, it can create a clearance between these sliding faces 81a and 82a and weaken the attracting force. In this case, it is preferable that the sliding face 81a of the coil housing 81 be machined to match the sliding face 82a of the armature plate 82, which may have a deformation, for achieving a higher adhesive property.

Now, rotational unbalance adjustments for the propeller shaft PS and the rear coupling RC of the above described power transmission are described. At first, an adjustment method practiced in the prior art is described. The propeller shaft PS as a single part before the assembly is measured for a rotational unbalance, and a balance weight is attached to a predetermined position on the propeller shaft PS to eliminate the measured unbalance. Even after this adjustment, a little unbalance remains because it is difficult to completely eliminate the rotational unbalance only by the attachment of a balance weight. Therefore, this remaining unbalance is measured, and a first mark for indicating this measured unbalance is put on the end face or outer periphery of the yoke flange 38, which is provided at the rear end of the propeller shaft PS. The first mark is oriented to indicate the direction along which the unbalanced rotating mass becomes larger. Also, before the assembly of the above mentioned rear axle device AR, the companion flange 30 as a single part is measured for a rotational unbalance, and to eliminate this unbalance, a balancing hole is bored at a predetermined position of the companion flange 30. Again, even after the boring of a balancing hole, a little unbalance remains because of the difficulty to completely eliminate the rotational unbalance only by the boring of a balancing hole. Therefore, the unbalance remaining after the boring is measured, and a second mark for indicating this measured unbalance is put on the end face or outer periphery of the companion flange 30. The second mark is oriented to indicate, for example, the direction along which the unbalanced rotating mass becomes smaller. After these adjustments, the rear axle device AR is assembled with the yoke flange 38.

Then, the companion flange 30, after it is assembled in the rear axle device AR, and the propeller shaft PS, which has been adjusted against the unbalance as described above, are connected to each other by the fastening bolts 35. In this instance, the companion flange 30 is rotated and positioned with respect to the yoke flange 38 such that the first mark and the second mark be closest to each other. As mentioned above, the first mark indicates the direction where the unbalanced rotating mass becomes heavier while the second mark indicates the direction where the unbalanced rotating mass becomes lighter. In this coupling, the remaining unbalances of both the parts act to eliminate each other, minimizing the unbalance as a whole.

Figure 5:
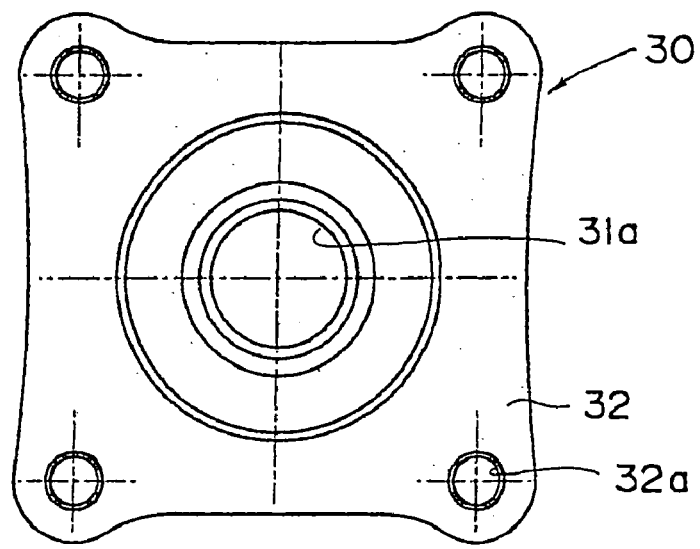
FIG. 5 is a view of the end face of a companion flange used for the rear axle device.

Now, the rotational positioning (phase matching) of the first mark and the second mark is detailed in the following. FIGS. 7, 8 describe schematically a method for rotational positioning according to the prior art while FIGS. 9~14 describe schematically a method for rotational positioning according to the present invention. FIGS. 7~14 are views of the end face of the companion flange 30, which are similar to what is shown in FIG. 5, taken along line V-V in FIG. 3. In FIG. 5, the end face is shown in a rectangular figure, but this is only an example. The shape of the end face does not matter much, so in the following embodiments, which refer to FIGS. 7~14, the end face is shown in a circular figure.

In FIG. 7A, arrow W1 indicates the direction along which the rotating mass of the propeller shaft as a single part becomes heavier, and a first mark 33 is painted at a heavy point on the outer peripheral surface of the yoke flange 38. Also in FIG. 7B, arrow W2 indicates the direction along which the rotating mass of the companion flange 30 as a single part becomes heavier, and a second mark 39 is painted at a light point on the outer peripheral surface of the companion flange 30. Furthermore, FIGS. 8 and 9 show the positions of the first mark 33 and the second mark 39 after the companion flange 30 and the yoke flange 38 are coupled with each other, and arrow W3 indicates the composite unbalance, which is the result of a combination of the single unbalances of the two flanges 30 and 38. The composite unbalance W3 becomes smallest when the first mark 33 and the second mark 39 come closest to each other as described above.

As a prior-art rotational positioning, there is a method for assembling the parts to position the first mark 33 and the second mark 39 within a range or phase of a predetermined angle, which is the angle between the first mark 33 and the second mark 39 that produces a maximum allowable composite unbalance W3. In executing this rotational positioning, the assembler, i.e., the worker, must confirm that the phase difference between the first mark 33 and the second mark 39 is within the predetermined angle while he is matching the bolt holes 32*a* for the insertion of fastening bolts 35 to couple the yoke flange 38 of the propeller shaft with the companion flange 30. However, the deviation of the rotational positioning (phase deviation) of the prior-art method is significantly large because there is no indication available of how great the phase difference is between the first mark 33 and the second mark 39 is. To eliminate the deviation in the rotational positioning (phase matching), conventionally, the bolt holes 32*a* near the first mark 33 and the second mark 39 are determined, respectively, and then these bolt holes 32*a* are matched with each other for the fastening. However, even in this method, there is no indication available of which of the near bolt holes 32*a* be used as the closest bolt hole for the fastening. In considering a case of four bolt holes 32*a*, the phase difference is 90 degrees (=360/4) between the nearest bolt holes. As shown in FIG. 8, angles α1 (positive angle) and α2 (negative angle) can deviate within maximum ranges of +90 degrees and −90 degrees, respectively. As a result, the composite unbalance can be accordingly large (compare, for example, the composite unbalances W3 shown in FIGS. 8A and 8B).

Figure 9A:
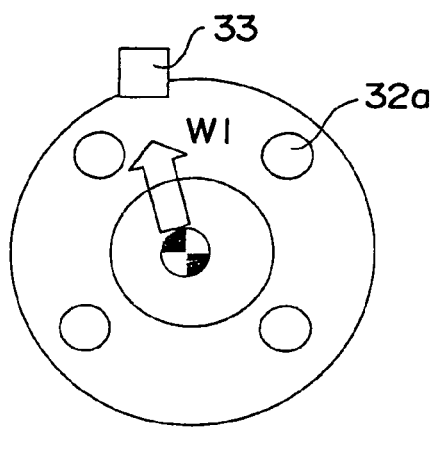
FIGS. 9A and 9B are approximate sectional views describing the individual unbalances and the heavy and light point marks of the propeller shaft and the companion flange, respectively, of a first embodiment according to the present invention.
Figure 9B:
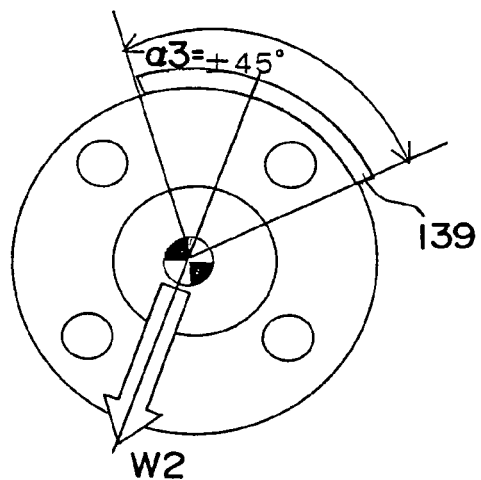
Figure 10:
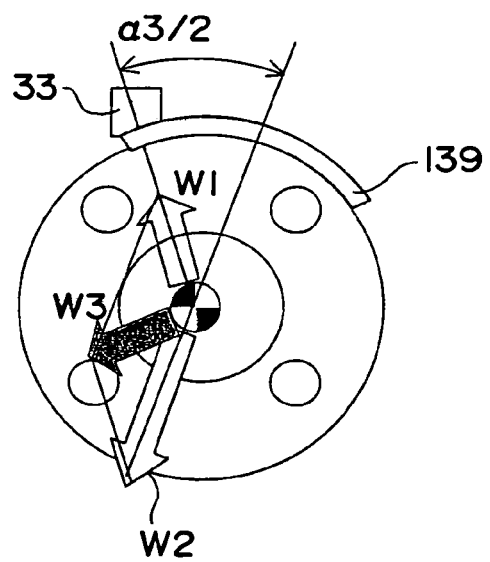
FIG. 10 is an approximate sectional view describing an unbalance that results from a combination of the individual unbalances described in FIGS. 9A and 9B.

In contrast to this, FIGS. 9 and 10 show a first embodiment according to the present invention. In FIG. 9A, arrow W1 indicates the direction along which the rotating mass of the propeller shaft as a single part becomes heavier, and a first mark 33 is painted at a heavy point on the outer peripheral surface of the yoke flange 38 in the same way as in the prior-art method. On the other hand, in FIG. 9B, arrow W2 indicates the direction along which the rotating mass of the companion flange 30 as a single part becomes heavier, and a second mark 139 is painted at a light point on the outer peripheral surface of the companion flange 30. In this case, the second mark 139 is a band-like mark that covers the region defined by a predetermined angle as shown in the drawing. This angle is set at α3±45 degrees because four bolt holes 32*a* are positioned evenly in this embodiment. Generally, in the case where the number n of bolt holes 32*a* are provided evenly, the angle is set at α3=±360/2n degrees. By widening the angular region of the second mark 139 on the companion flange 30 in this way, this mark is made larger, indicating the phase difference in a wider region. As a result, the assembler can easily discriminate the angular phase and can easily position the first mark 33 onto the band-like second mark 139, improving the ease and accuracy of the assembly. Also, because the angular region of the second mark 139 is ±45 degrees, the maximum of the phase deviation is also ±45 degrees. Accordingly, the composite unbalance W3 is relatively small in comparison with that in the prior-art method. FIGS. 11A and 11B describe, in further detail, the effect of the present invention to the composite unbalance W3 in comparison with that of the prior art. FIG. 11A illustrates the composite unbalance W3 at the maximum phase deviation (±90 degrees) possible in the prior art described above while FIG. 11B illustrates the composite unbalance W3 at the maximum phase deviation (±45 degrees) possible in this embodiment according to the present invention. In the prior art, for example, if unbalance W1 and unbalance W2 are equal to each other in magnitude, then composite unbalance W3 is 1.41 times greater than each component unbalance. Contrastingly, in the embodiment according to the present invention, if unbalance W1 and unbalance W2 are equal to each other in magnitude as in the preceding case, then composite unbalance W3 is 0.76 times greater than each component unbalance. Therefore, the maximum of the composite unbalance W3 expected in this embodiment is 0.54 (=0.76/1.41) times as large as that expected in the prior art. Clearly, this is a great reduction.

Figure 12A:
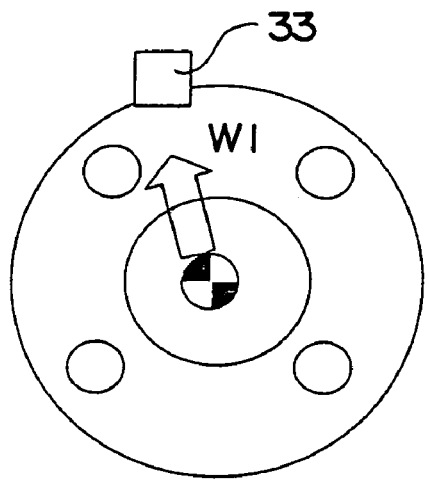
FIGS. 12A and 12B are approximate sectional views describing the individual unbalances and the heavy and light point marks of the propeller shaft and the companion flange, respectively, of a second embodiment according to the present invention.
Figure 12B:
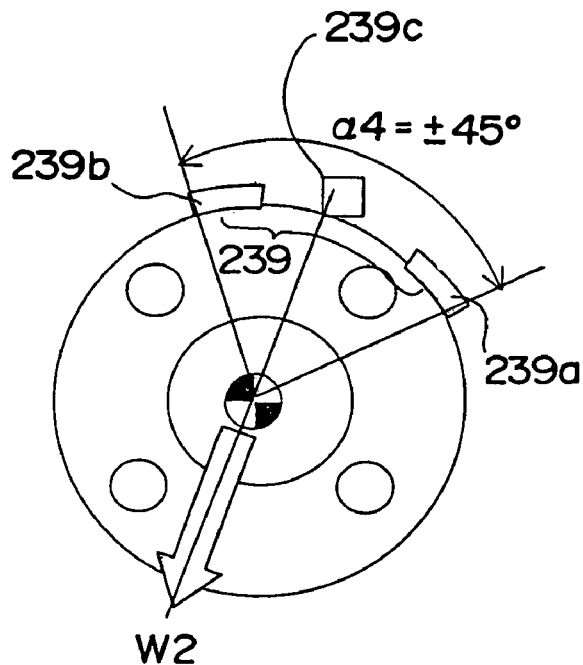
Figure 13:
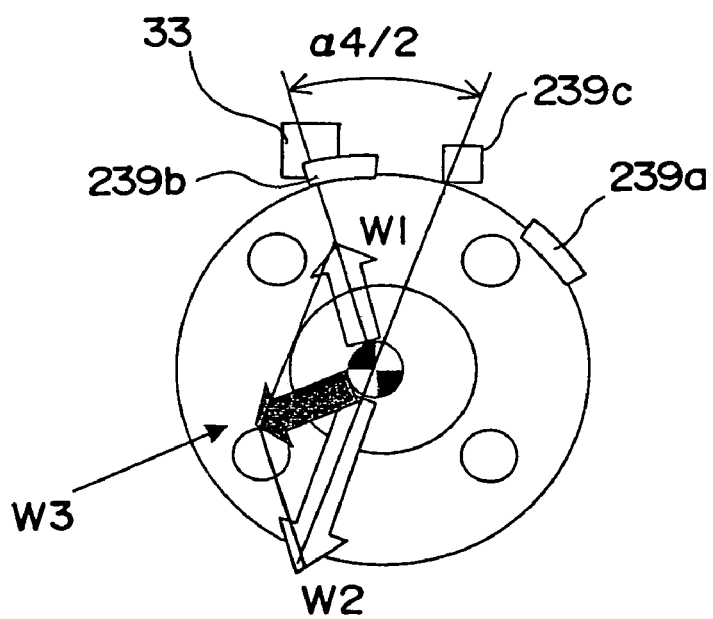
FIG. 13 is an approximate sectional view describing an unbalance that results from a combination of the individual unbalances described in FIGS. 12A and 12B.

Now, a second embodiment according to the present invention is described in reference to FIGS. 12 and 13. In FIG. 12A, arrow W1 indicates the direction along which the rotating mass of the propeller shaft as a single part becomes heavier, and a first mark 33 is painted at a heavy point on the outer peripheral surface of the yoke flange 38 in the same way as the prior art. On the other hand, in FIG. 12B, arrow W2 indicates the direction along which the rotating mass of the companion flange 30 as a single part becomes heavier, and a second mark 239 is painted at a light point on the outer peripheral surface of the companion flange 30. This second mark 239 comprises a pair of band-like marks 239a and 239b, each of which extends over a certain length inward from the respective boundary of the predetermined angular region as shown in the drawing. The angle between both the marks 239a and 239b inclusive is set at α4=+45 degrees. However, in this case, the angular region between the two marks 239a and 239b inclusive can be considered as a second mark 239 that covers the predetermined angular region (refer to FIGS. 12B and 13). Therefore, this embodiment achieves the same effects as the above described first embodiment on the points of accuracy in discriminating the angular phase, ease of assembly and reduction of the phase deviation, and it achieves as an additional effect a reduction in the paint consumption for marking the second mark 239 because the areas actually painted as marks 239a and 239b are smaller than the previous embodiment. Here, if a central mark 239c is provided additionally between these band-like marks 239a and 239b, which constitute the second mark 239, then the visibility of the second mark as a whole in the assembly process is improved to a level almost equal to that in the case where the whole angular region is marked in a band.

Figure 14:
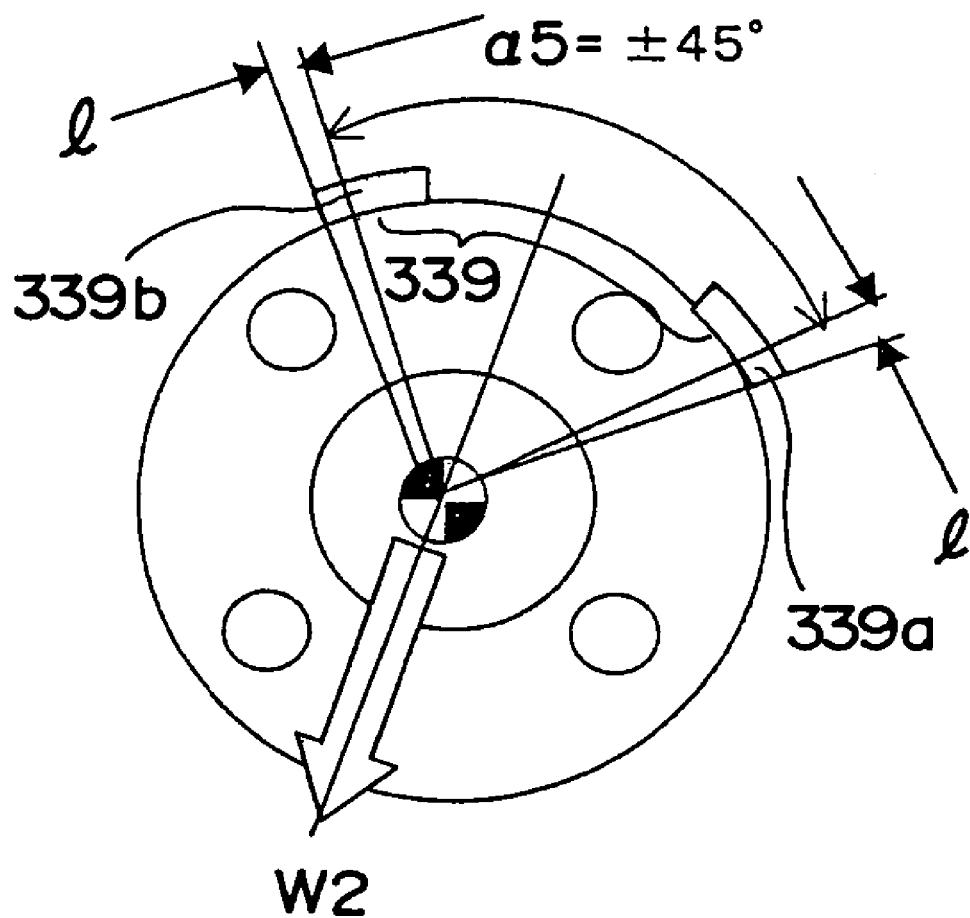
FIG. 14 is an approximate sectional view describing the individual unbalance and the light point mark of the companion flange of a third embodiment according to the present invention.

FIG. 14 shows a third embodiment as a modification example of the above described second embodiment, so it shows only the unbalance of the companion flange 30 as a single part, which is marked differently from that shown in FIG. 12B. For the other elements, reference is made to FIG. 12A and FIG. 13. A second mark 339 shown here comprises a pair of band-like marks 339a and 339b, each of which is provided inward from the respective boundary of the angular region as the second mark 239 of the second embodiment, and the predetermined angle α5 is also ±45 degrees. However, in this embodiment, the marks 339a and 339b are painted each overextending by a length l outward from the respective boundary of the angular region. In other words, the marks are painted beyond the angular region α5, not to let the angular region, which is marked by the second mark 339, become smaller accidentally even if there is a deviation of the painting range in actual marking process. In this way, accident where the first mark 33 (refer to FIG. 12A and FIG. 13) does not come into the angular region of the second mark 339 in the coupling process is avoided notwithstanding the accuracy of the painting process.

In the above described embodiments, the band-like second mark, which has an angular region, is provided commonly on the companion flange 30. However, the provision of an angular region should not be limited to the second mark on the companion flange 30. The yoke flange 38 may be provided with the second mark, with a condition that one of the first mark and the second mark be given an angular region. However, it is preferable that the companion flange 30 be provided with a mark that has an angular region as described in the above embodiments because the provision of a mark with an angular region improves the workability during the assembly. In the process of coupling the propeller shaft PS to the axle device AR, at first, the axle device AR is mounted in the vehicle, with the mark on the companion flange 30 facing downward, and then the mark on the yoke flange 38 is matched to the mark on the companion flange while the propeller shaft PS is being rotated. For this procedure, it is better for visibility that the band-like mark with an angular region be provided on the companion flange 30. Also, the reason is that, generally, the rotational unbalance of the propeller shaft PS is corrected after it is mounted in the vehicle. On the other hand, it is difficult to correct the rotational unbalance of the axle device AR after the axle device AR is mounted in the vehicle because of its structural complication, because the axle device is often soiled with mud during running. Therefore, preferably, the yoke flange 38 of the propeller shaft PS has a form that includes a lightening hole while the companion flange 30 of the axle device AR has a circular form to cover the yoke flange 38, though these forms are not shown in the drawings. In this arrangement, it is preferable that the band-like mark with an angular region be provided on the companion flange 30 of the axle device.

Though the above description is made of the rear coupling RC, the same is true of the front coupling FC.

Figure 15:
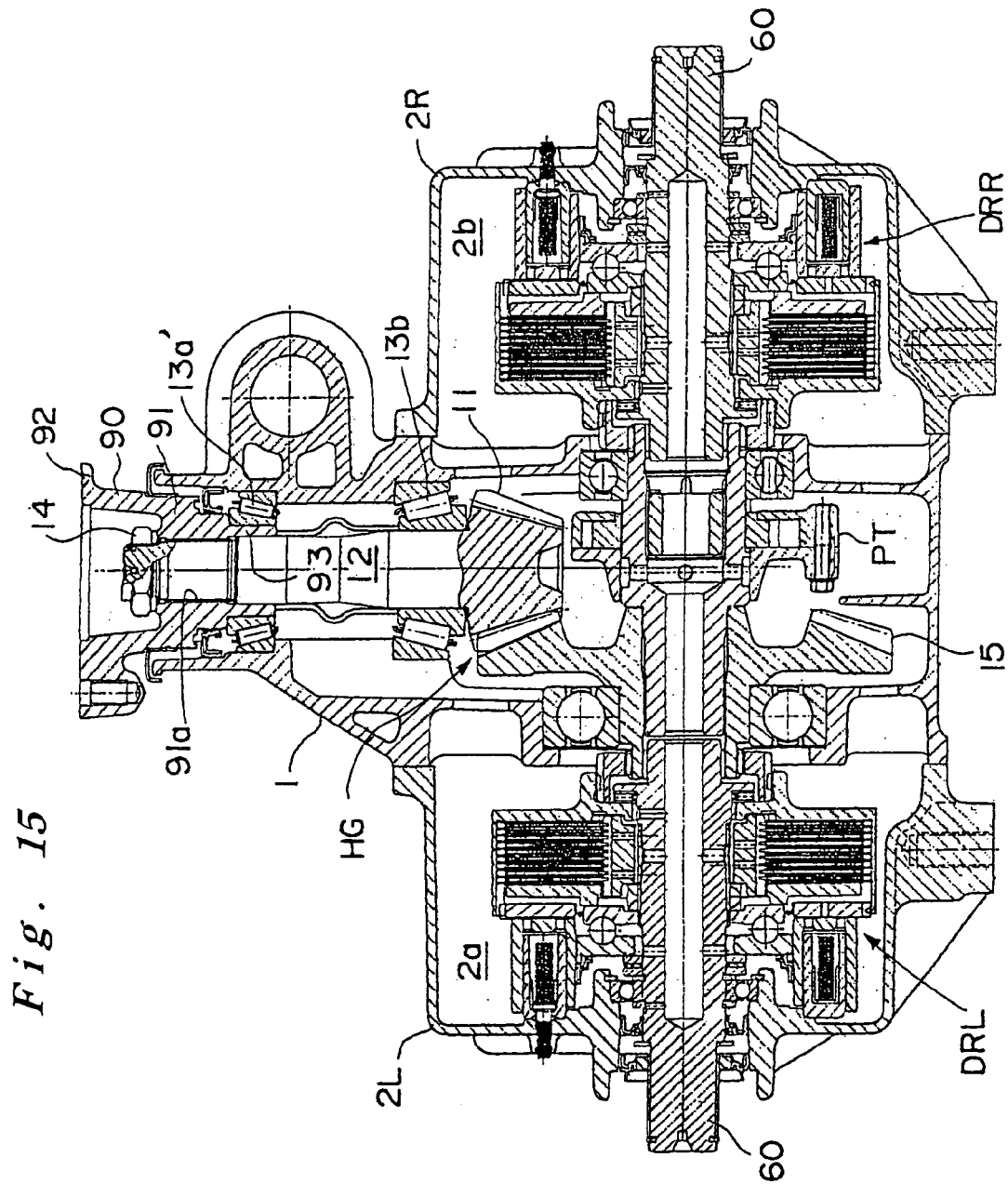
FIG. 15 is a sectional view showing another example of rear axle device, which is different from that shown in FIG. 2. This device constitutes the power transmission system.

FIG. 15 shows a rear axle device as another embodiment. This axle device is similar to the above described axle device shown in FIG. 2~FIG. 5 and differs only that it has a different companion flange 90 and a different coupling structure for the companion flange 90. The other parts are identical with those of the previous embodiment, so the identical parts are given the same numbers to leave out redundant explanation. The companion flange 30, which is shown in FIG. 2~FIG. 5, is connected through splines 31a to the pinion shaft 12, which is supported rotatably by the taper roller bearings 13a and 13b. Therefore, there is little rotational unbalance. However, because the companion flange 30 has a rotational looseness that corresponds to the back-lash of the splines 31a, it is likely to generate a vibration from the rotational unbalance. In contrast, the companion flange 90 shown in FIG. 15 comprises a boss portion 91, whose rear end 91a extends axially inward, and the rear end 91a is supported rotatably by a taper roller bearing 13a'. Because the companion flange 90 is supported directly by the taper roller bearing 13a', the companion flange 90 is unlikely to generate a vibration.

Figure 16:
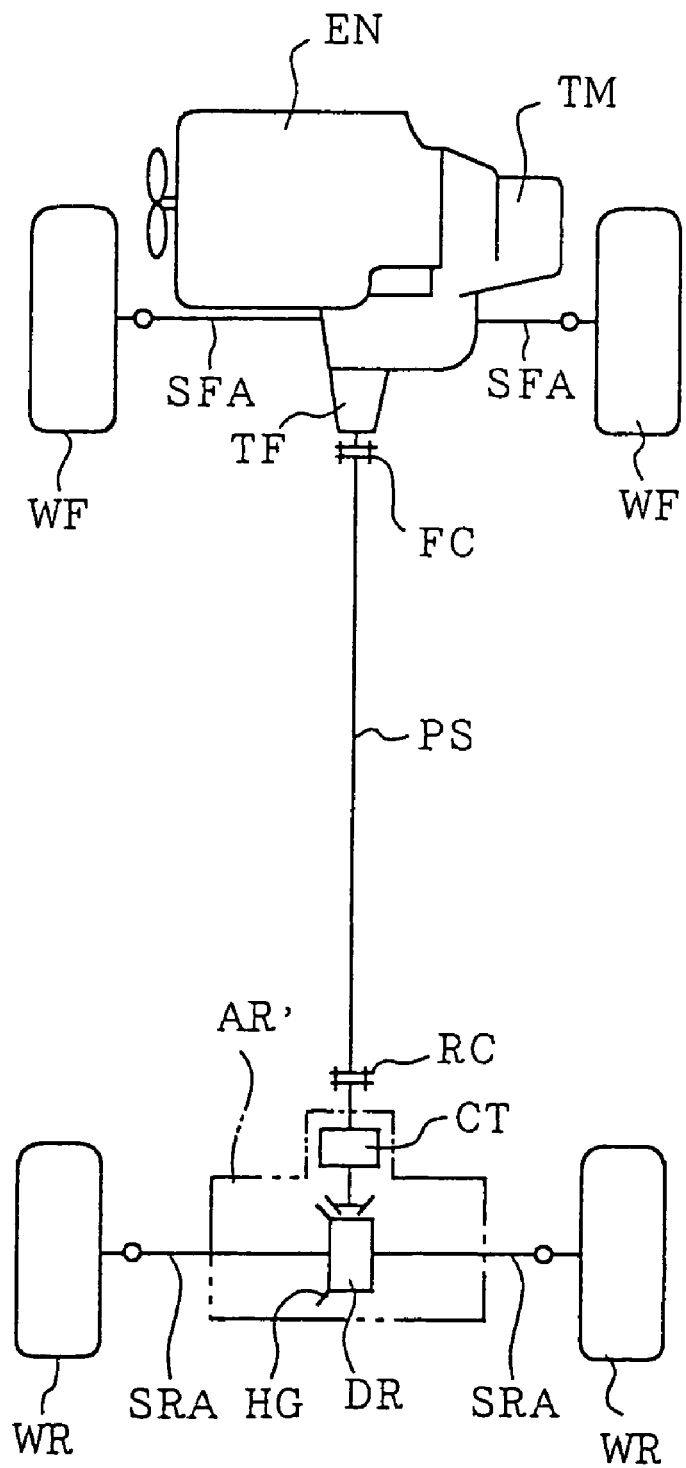
FIG. 16 is a schematic diagram describing the power transmission system of another four-wheel drive vehicle, which system comprises a power transmission according to the present invention.

In the above described rear axle device AR, the right and left rear differential clutch mechanisms DRR and DRL are positioned on the right and left sides of the driven gear 15, which constitutes the hypoid gear mechanism HG. However, as shown in FIG. 16, an electromagnetic clutch mechanism according to the present invention may be provided rotationally before the hypoid gear mechanism HG. In FIG. 16, the components identical with those of the power transmission system shown in FIG. 1 are given the same numbers, respectively, to leave out redundant explanation.

In the power transmission system shown in FIG. 16, the electromagnetic clutch mechanism, which constitutes a 2-4 switching mechanism CT, is positioned rotationally between the rear coupling RC and the hypoid gear mechanism HG. The 2-4 switching mechanism CT is used to cut or connect power transmission from the propeller shaft PS to the hypoid gear mechanism HG for establishing a two-wheel drive mode or a four-wheel drive mode, respectively. Then, the power from the hypoid gear mechanism HG is divided by the rear differential mechanism DR and transmitted to the right and left rear wheels WR. The rear differential mechanism DR may comprise a generally used mechanism in the prior art or may comprise the above described right and left rear differential clutch mechanisms DRR and DRL.

As described above, the coupling structure and coupling method according to the present invention offsets effectively the rotational unbalances of the propeller shaft and the companion flange. To improve the effectiveness of the offsetting, one mark is provided on one of these components over a predetermined angular region around the rotational axis, and another mark is provided on the other. For the coupling, this latter mark is placed within the angular region of the former mark. By adopting this coupling structure and coupling method, the accuracy of discriminating the angular phase is improved because a large mark with an angular region, which is easy to see, is matched by another mark for the positioning of the rotational components. For the number n of bolts used for the fastening, the angular region can have a phase deviation only within a range approximately from +360/2n to −360/2n degrees. Therefore, the coupling structure and coupling method according to the present invention achieves a high effectiveness for offsetting the rotational unbalances and minimizes the unbalance by the offset.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2003-414238 filed Dec. 12, 2003, which is incorporated herein by reference.

What is claimed is:

1. A coupling structure for a power transmission comprising a propeller shaft, which transmits a rotational driving force, and a rotation-transmitting device, which is connected to said propeller shaft and transmits the rotational driving force, said coupling structure being for connecting said propeller shaft and said rotation-transmitting device;

wherein:
a first mark for indicating a direction of a rotational unbalance of said propeller shaft is provided on said propeller shaft while a second mark for indicating a direction of a rotational unbalance of a companion flange is provided on said companion flange, which is to be connected to said propeller shaft at said rotation-transmitting device;

of the directions of said rotational unbalances indicated by said first mark and said second mark, one direction is set as a direction along which a rotating mass becomes larger while another is set as a direction along which a rotating mass becomes smaller;

furthermore, one of said first mark and said second mark is provided over an angular region with a predetermined angle around an axis; and said propeller shaft and said companion flange are connected with each other on a basis of said first mark and said second mark, wherein said angular region is set approximately from +180/n to −180/n degrees, where n is a number of bolt holes used for connecting said propeller shaft and said companion flange.

2. The coupling structure as set forth in claim 1, wherein:
said first mark or said second mark that is provided over said predetermined angular region marks, as a band, all of said angular region.

* * * * *